United States Patent [19]

Graham et al.

[11] 4,064,785
[45] Dec. 27, 1977

[54] THREADED CONNECTIONS

[76] Inventors: Peter Charles Graham, 9 Jasmyn Street; Joseph Theo Renison, 9 Begonia Street, both of Welkom, South Africa

[21] Appl. No.: 638,088

[22] Filed: Dec. 5, 1975

[30] Foreign Application Priority Data

Dec. 9, 1975 South Africa .................. 75/7803

[51] Int. Cl.² ........................................... F16B 31/02
[52] U.S. Cl. ......................................... 85/62; 285/2
[58] Field of Search .................. 85/62, 61, 1 T, 79, 85/50 A, 50 R; 10/155 R; 285/2, 1; 52/573

[56] References Cited

U.S. PATENT DOCUMENTS

| 3,060,731 | 10/1962 | Adise | 85/62 X |
| 3,087,371 | 4/1963 | Orner | 85/62 |
| 3,461,715 | 8/1969 | Stover | 85/62 |

FOREIGN PATENT DOCUMENTS 1,184,033   3/1970   United Kingdom .................. 85/62

*Primary Examiner*—Ramon S. Britts
*Attorney, Agent, or Firm*—Haseltine, Lake & Waters

[57] ABSTRACT

A break-out washer assembly for facilitating undoing a connection between interengaged complementally threaded elements. The assembly comprises a washer which tapers radially inwardly and is made of a ductile material and a pair of annuli which straddle the washer, the annuli being complementally shaped to the washer and being made of a relatively harder material. The assembly is interposed between opposing shoulders of the threaded elements which are tightened to extrude the washer and impose a hoop stress on it. The connection is undone by breaking the washer at a chosen circumferential position.

3 Claims, 1 Drawing Figure

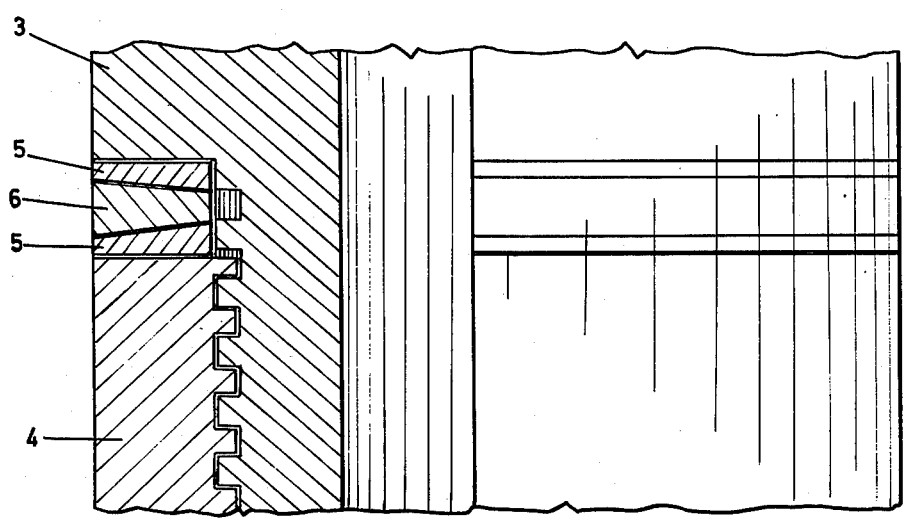

THREADED CONNECTIONS

This invention relates to threaded connections of the kind which are used in drilling operations to connect a rotary working tool to a driven member.

Threaded connections of the kind in question are found in mining operations on raise borers where the tools are connected by threaded spigot and socket connections. In use the threaded connection becomes highly torqued so that undoing of the connection is a difficult task. Conventionally hydraulic wrenching tools are used, but their use nevertheless involves time and considerable physical strength on the part of the operators.

An object of the invention is to facilitate the undoing of highly torqued connections.

According to the invention there is provided a method of forming a screwed joint between complementally threaded members to facilitate undoing the joint comprising confining a washer under hoop stress between the members so that the joint may be undone by breaking the washer.

Also according to the invention there is provided a method of forming a connection between two interengaging screw-threaded elements having opposed annular shoulders comprising the steps of placing between the shoulders a washer which decreases in thickness radially inwardly and is made of a ductile material that is softer then complementally shaped formations on the shoulders and tightening the connection to an extent where the washer is stressed near to its ultimate yield strength.

When it is desired to break the connection, material is removed from the washer to reduce the thickness of the washer at a chosen radial position so that the washer breaks at the position under the stress imposed on it.

For use in the above method, the invention also provides a break-out washer which tapers radially inwardly and is made of a ductile material relatively softer than the formations. For use with hardened steel formations, the washer could be mild steel.

If the shoulders or one of them is not tapered complimentally to the washer, then the invention provides that a complementally shaped hard annulus be provided to lead to a proper fit of the threaded parts.

In the preferred form of the invention the washer forms part of a break-out washer assembly composed of two annuli of hard material each tapering on one face and an intermediate soft, ductile washer tapering on both faces.

The invention also includes an assembly of two interengaged screw-threaded elements with an interposed break-out washer assembly.

The invention is further discussed with reference to the accompanying drawing, the sole figure of which is a view partly in section of a screw conection utilizing the principles of the invention and the washer assembly of the invention.

In the drawing a spigot 3 is shown screwed into a socket element 4. Between the shoulders on the two elements there is a washer assembly composed of two outer rings 5 and a central washer 6. The rings 5 are machined flat on the faces abutting the components 3 and 4. The opposite faces taper outwardly. The washer 6 tapers radially inwardly on both faces as shown.

The rings 5 are made of a suitably hard material such as hardened steel. The washer 6 is made of a relatively softer ductile material such as mild steel.

As seen in the drawing, the rings and washer have inner annular surfaces directly facing spigot 3 and form clear annular gaps therewith devoid of any structure. The inner annular surface of the washer is interposed between the rings to hold the same apart in axially spaced relation for a reason which will become clear later.

Prior to use or in use the joint is subjected to torque forces such that the washer 6 is stressed to near to its yield strength. At this stage the washer 6 is merely held in place by its own hoop strength, i.e. its strength to resist tensile stresses, termed hoop stresses in this specification imposed circumferentially on it by being extruded radially outwardly when the joint is tightened. When the joint is to be undone, all that is necessary is to reduce the cross-sectional area of the washer 6 to such an extent that the forces acting on the washer 6 cause it to break. This is conveniently done by drilling a hole of a suitable diameter radially into the washer 6. Since the washer is of mild steel, this can be done very easily by using a hand drillig machine.

When the washer breaks, the threaded connection is unstressed and can be loosened very easily.

The essence of the invention is that the center washer is stressed to the extent that it will break when a hole is drilled into it and the magnitude of the stress is determined by the choice of material, angle of taper and the cross-sectional area of the washer 6. The use of heat is not necessary and the threads remain undamaged.

Note that the rings 5 may be used over and over again so that the only replacement part needed is the washer 6.

We claim:

1. A break-out assembly in combination with a connection between interengaged screw-threaded male and female elements enabling the elements to be separated after being threadably engaged under stress, the assembly comprising a continuous annular washer of ductile material capable of developing hoop stress, said washer decreasing in thickness radially inwardly and having an internal diameter which is free fit around the male threaded element, and a pair of separate continuous annuli of relatively harder material than the washer, the annuli being complementally shaped to the washer and sandwiching the washer between them to form a right cylindrical ring which, when axial pressure is applied between its ends, places the washer under hoop stress, said annuli and washer having inner annular surfaces directly facing said male threaded element and forming clear annular gaps therewith, said gaps being devoid of any structure between said inner annular surfaces and said male threaded element, said inner annular surface of said washer being interposed between the annuli and holding the same apart in axially spaced relation such that when the annuli are axially stressed and the washer is under hoop stress, breakage of the washer unstresses the connection allowing the threaded elements to be separated.

2. A break-out washer as claimed in claim 1, in which the annuli are made of hardened steel and the washer is made of mild steel.

3. A break-out washer assembly as claimed in claim 1 wherein said rings apply pressure to said washer to stress the washer to its yield strength so as to be capable of breakage by reduction of its cross-sectional area.

* * * * *